(12) United States Patent
Teng et al.

(10) Patent No.: US 11,693,936 B2
(45) Date of Patent: Jul. 4, 2023

(54) USER AUTHENTICATION OVER AN AUDIO CHANNEL USING A MOBILE DEVICE

(71) Applicant: VMware, Inc., Palo Alto, CA (US)

(72) Inventors: Shengbo Teng, Beijing (CN); Wen Wang, Beijing (CN); Bin Guo, Beijing (CN); Wenping Fan, Beijing (CN); Tony Lu, Beijing (CN); Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 329 days.

(21) Appl. No.: 16/043,441

(22) Filed: Jul. 24, 2018

(65) Prior Publication Data

US 2020/0034521 A1    Jan. 30, 2020

(51) Int. Cl.
*G06F 21/32* (2013.01)
*H04L 9/32* (2006.01)
*H04L 9/40* (2022.01)

(52) U.S. Cl.
CPC ............ *G06F 21/32* (2013.01); *H04L 9/3213* (2013.01); *H04L 63/08* (2013.01); *H04L 63/107* (2013.01); *H04L 63/108* (2013.01)

(58) Field of Classification Search
CPC ..... H04L 67/08; H04L 63/107; H04L 63/108; H04L 9/3213; H04W 12/06; G06F 21/32; G10L 19/018
See application file for complete search history.

(56) References Cited

U.S. PATENT DOCUMENTS

| | | | |
|---|---|---|---|
| 8,850,219 B2 * | 9/2014 | Dapkus ................. | H04L 9/3234 713/185 |
| 10,200,364 B1 * | 2/2019 | Ketharaju ........... | H04L 63/0861 |
| 2005/0022108 A1 * | 1/2005 | Carro .................. | G06F 3/04842 715/256 |
| 2006/0094401 A1 * | 5/2006 | Eastlake, III ......... | H04W 12/06 455/411 |
| 2013/0132091 A1 * | 5/2013 | Skerpac .................. | G06F 21/32 704/273 |

(Continued)

OTHER PUBLICATIONS

J. Dittmann • P. Wohlmacher • K. Nahrstedt; Using cryptographic and. watermarking algorithms; IEEE Multi Media (vol. 8, Issue : 4, pp. 54-65); (Year: 2001).*

(Continued)

*Primary Examiner* — Jahangir Kabir
*Assistant Examiner* — Chao Wang

(57) ABSTRACT

A system is described for authenticating a user on a client device using the user's mobile device and utilizing the audio channel. An authentication server receives a request from the client to initiate a session for the user, creates the session, and sends a session token back to the client along with a request for authentication. The client broadcasts an audio transmission containing the token to the mobile device over an audio channel using data-over-sound transmission. The mobile device receives the transmission via a microphone, obtains the token and the server identity from the transmission, and sends user credentials that are stored on the mobile device along with the token identifying the session directly to the authentication server. The server verifies the received credentials, confirms the token, and logs the user into the session.

17 Claims, 4 Drawing Sheets

(56) References Cited

U.S. PATENT DOCUMENTS

| | | | | |
|---|---|---|---|---|
| 2015/0215299 A1* | 7/2015 | Burch | ................ | H04W 12/069 |
| | | | | 726/5 |
| 2015/0296377 A1* | 10/2015 | Sheu | ................ | H04W 12/06 |
| | | | | 380/279 |
| 2017/0243417 A1* | 8/2017 | Manikantan Shila | ................ | |
| | | | | H04W 12/06 |
| 2017/0301160 A1* | 10/2017 | Somani | ................ | H04N 7/183 |
| 2019/0007385 A1* | 1/2019 | Agrawal | ......... | H04W 12/00503 |

OTHER PUBLICATIONS

Arezou Soltani Panah • Ron Van Schyndel • Timos Sellis • Elisa Bertino; On the Properties of Non-Media Digital Watermarking: A Review of State of the Art Techniques; IEEE Access (vol. 4, pp. 2670-2704); (Year: 2016).*

Giuseppe Cattaneo • Luigi Catuogno • Fabio Petagna • Gianluca Roscigno; Reliable Voice-Based Transactions over VoIP Communications; 2015 9th International Conference on Innovative Mobile and Internet Services in Ubiquitous Computing (pp. 101-108); (Year: 2015).*

"Audio watermark—Wikipedia"; https://en.wikipedia.org/wiki/Audio_watermark#cite_note-1; retrieved on Jul. 23, 2018.

\* cited by examiner

USER AUTHENTICATION OVER AN AUDIO CHANNEL USING A MOBILE DEVICE

TECHNICAL FIELD

The present disclosure generally relates to user authentication on computing devices, and more specifically to authenticating a user on a computing device using a mobile device via an audio channel.

BACKGROUND

As more and more aspects of our professional and personal lives are handled and managed by computing devices and online services, people are increasingly inundated with the need to repeatedly log in and out of devices and online services throughout a typical day. Each time a person uses a password-protected computing device such as a desktop or laptop computer, the individual needs to enter a login ID and a password. Likewise, when the user accesses a password-protected application or online service, the individual must go through an authorization process. As a result, individuals are burdened with the inconvenience of having to memorize a variety of different passwords for a multitude of platforms and applications, and to type in their IDs and passwords, which can be in some cases quite complex, several times throughout the course of a day.

Existing solutions for user authentication that don't require manual password entry, such as fingerprint sensors, smartcards, key fobs, etc., can alleviate some of the burdens of manual password entry systems. Additionally, single sign-on (SSO) systems are frequently utilized by enterprises to reduce the number of times that the user must manually input their credentials. However, all these solutions have their own respective drawbacks, such as requirements for additional hardware on the computing device or additional devices for the user to carry and operate, as well as the overhead and labor incurred in setting up and managing additional services, particularly in the enterprise setting. At the same time, almost every individual today carries a personal mobile computing device, such as a smart phone, which has ample capability that is not currently being fully utilized for authenticating the user on other devices.

A more efficient approach is desirable for performing user authentication on computing devices.

DETAILED DESCRIPTION

Figure 1:
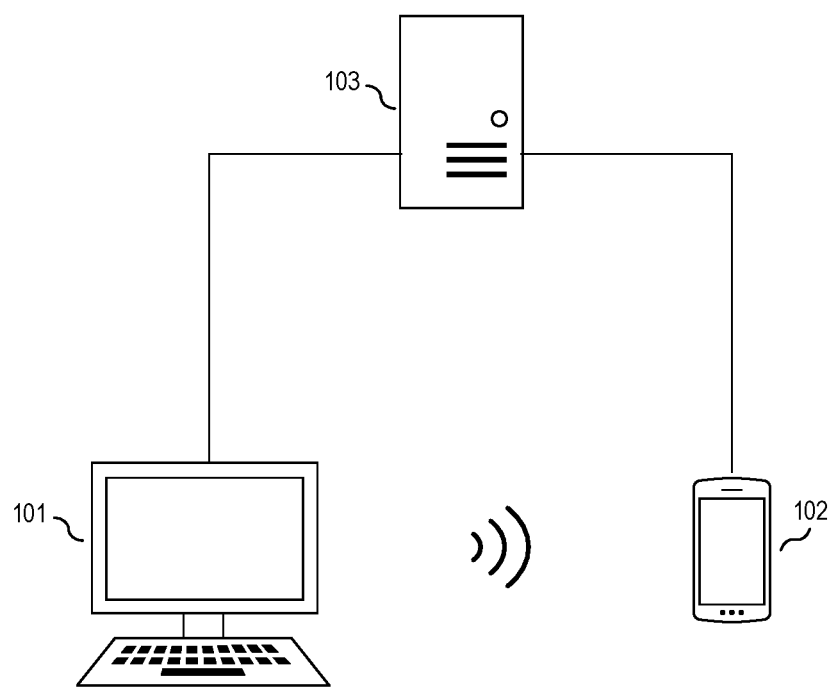
FIG. 1 illustrates an example of a system for user authentication on a client using a mobile device, in accordance with various embodiments.

Systems and methods in accordance with various embodiments of the present disclosure overcome at least some of the above-mentioned shortcomings and deficiencies by providing more efficient ways to authenticate a user on a computing device using the user's mobile device in more streamlined and convenient ways than traditional authentication methods such as manual password entry. In particular, embodiments described herein provide a system where a user who wishes to establish a session on a computing device (the "client") is able to use the user's mobile device to authenticate her or him-self in an automated, convenient, and secure manner utilizing an audio channel established between the client and the user's mobile device.

In this architecture, the client device is connected via a network to an authentication server that manages user authentication on the client. In one embodiment, the authentication server is part of a single sign-on (SSO) system deployed by an enterprise to control access to various corporate resources and services. When the authentication server receives a request from the client to initiate a session for a user, the server creates the session and sends a token containing session-identifying information ("session ID") back to the client along with a request for authentication. The client then broadcasts an audio transmission containing the token to the mobile device over an audio channel using a data-over-sound transmission. That is, the client plays the audio message encoded with the token via a multimedia speaker. The mobile device receives the audio transmission via a microphone, decodes the token and the server identity from the audio transmission, and sends user credentials that are stored on the mobile device along with the token identifying the session directly to the authentication server over a network connection (e.g. Internet connection). The server verifies the received credentials, confirms the token, and logs the user into the session that was created for the client. The user is then able to access the session via the client.

From the user's perspective, to log into the client the user merely brings the user's mobile device in sufficient proximity of the client to detect the audio signal from the client. The mobile device decodes the necessary information from the audio signal and automatically authenticates the user directly with the authentication server to log the user into the session on the client. In some embodiments, the user may be required to provide input on the mobile device, for example to confirm performing the authentication, to launch the mobile authentication application on the mobile device, or to enter the username and password when logging in for the very first time, after which the credentials will be saved to the mobile device for future logins. In other embodiments, the entire process can be performed automatically without any user inputs by the mobile authentication application running permanently as a background process on the mobile device. As a result, the user is relieved of the burden of entering a password or user ID and can achieve authentication by, at most, placing the mobile device in proximity of the client and performing a few simple inputs.

In addition, significant flexibility is afforded to the system by eliminating the need to provide a method for the user to authenticate him or her-self directly on the client. Namely, for the user to log in using the described system, the client device only needs to be equipped with a speaker (e.g. computer speaker) capable of communicating the requisite information to the mobile device over the audio channel. Since the user does not need to enter any authenticating information into the client directly, in some cases the client device does not even require a screen, a keyboard, or other such input/output capability. As will be described in more detail below, this allows the system to be implemented in applications where limited client-side input/output devices are used, such as in enforcing authorized access to automobiles or other devices on which password entry in impractical, or even in applications for visually impaired individuals.

FIG. 1 illustrates an example of a system for user authentication on a client using a mobile device, in accordance with various embodiments. As illustrated in the example of FIG. 1, a client 101 is communicatively linked to an authentication server 103 over a network. In this example, the client 101 is a desktop computer that provides access to an application or service that requires a user to be authenticated before the user is permitted into a session with the application or service. In various embodiments, the application may be a native application or a web application that is hosted on a server and accessed via an Internet browser on the client 101. The authentication server 103 provides a network service for authenticating users of the application. In some embodiments, the authentication server 103 is part of a single sign-on (SSO) system that provides authentication for numerous services and corporate resources of an enterprise.

The process begins by the user requesting a session with the application on the client 101. For example, the user can open the application on the client 101 and click a "Login" button. If the application is web-based, then the user can access the application by entering a URL on a web browser and requesting to log in. In response to the user request for a session, the client 101 sends a login request to the authentication server 103 over a conventional network connection (e.g. Internet connection). The login request can be produced by the application or by the web browser if the application is web-based.

When the server 103 receives the login request, it initiates a session and sends a request for user authentication to the client 101. With the request for authentication, the server 103 also sends a session token containing a session identifier (session ID) so that responses to the request can be associated with the corresponding session based on the token. For security reasons, the server 103 can also include an expiration time period in the token (e.g. 10 minutes) such that authentication attempts into the session after expiration of the set time period are rejected. The server 103 also sends server identifying information such as its IP address to the client in the authentication request along with the token, so that the server 103 can be identified and located when messages are transmitted back to the server 103.

In an embodiment, for security reasons the server 103 can encrypt the contents of the request of authentication message that is sent to the client 101 (e.g., using the server's 103 private key). For example, the web browser and server 103 can connect over a secure encrypted connection, such as an SSL (Secure Sockets Layer) connection.

The server's 103 request for authentication including the session token and server information is received at the client 101, and the client 101 then transmits the authentication request to the user's mobile device 102 via an audio transmission. The mobile device 102 can be any kind of portable computing device, such as a smartphone, smart watch, tablet, etc. In order to convey the authentication request to the mobile device 102 via an audio transmission, the information is encoded at the client 101 into an audio message, and the message is played via a speaker of the client 101 to be received via a microphone on the user's mobile device 102. As will be described in more detail below, the mobile device 102 contains a mobile authentication application that performs corresponding mobile device-side functions of the system for authenticating the user. When the client 101 transmits the audio message, the mobile authentication application accesses the microphone of the mobile device 102 to record and capture the transmitted audio message.

Different methods are available for transmitting data over an audio channel from the client 101 to the mobile device 102 as described above. In general, these methods involve encoding a message into an audio transmission, sending the encoded transmission from a speaker of the sending device to the microphone of the receiving device, and decoding the received audio transmission on the receiving device to extract the message. For example, communication over the audio channel can be implemented using an open source library such as the Quiet Modem Project. The audio frequencies can be selected outside of the audible range so that the data transfer is less disruptive to users and for security and management purposes. Additionally, the data transfer over the audio channel can be adjusted to be only effective within a certain maximum distance, such as 10 to 20 cm between client 101 and mobile device 102, in order to avoid audio interference among multiple clients and for other reasons. For example, the intensity of the signal can be adjusted to control the range of the channel.

To ensure that the complete message is successfully delivered from the client 101 to the mobile device 102, in various embodiments the audio transmission can be configured so that the message is repeated several times over a predetermined duration of time, e.g., 10 seconds. For example, the client 101 can play the message back-to-back continuously (e.g., loop the message), or with pauses in between, for the predetermined period of time. This way, if the user is slow to bring the mobile device 102 within audible range of the client 101 or too fast to pull it away, if there is interference for part of the transmission, or if for some other reason the mobile device 102 is unable to receive the entire transmission sent by the client, the mobile device 102 may still be able to extract the entire message by picking up only a portion of the transmission, since the message is repeated throughout the transmission. One way of producing such an audio transmission with repeated content is by using an audio watermark algorithm.

An audio watermark algorithm produces an audio watermark by embedding a unique electronic identifier in an audio signal. Conventionally, such audio watermark algorithms have been used to identify ownership of copyrights. The audio watermark algorithm embeds identifying data repeatedly throughout the audio signal analogously to how a watermark is printed over an entire document. In various embodiments, such an audio watermark algorithm can be used to embed the message repeatedly into the audio transmission from the client 101 to the mobile device 102. To do this, the watermark algorithm can be instructed to embed the message in the same way that the algorithm would typically embed a watermark into an audio stream that can be of a predetermined duration, e.g., 10 second. Hence, the audio watermark algorithm can be instructed to embed the message contents as an audio watermark in the transmission. When played to the mobile device 102, the resulting audio stream will contain numerous repetitions of the message throughout the transmission appearing as an audio watermark on the signal. When the transmission is received at the mobile device 102, it is decoded using the audio watermark algorithm and the message is extracted as the watermark. On the mobile device, the audio watermark decoding functions can be performed by the mobile authentication application.

In the described embodiment, the encoding of the message into the audio transmission (e.g., the audio watermark encoding) takes place on the client 101 in order to offload the work from the server 103 and simplify the server 103 processes. However, in other embodiments the audio encoding (e.g., the audio watermark encoding) can take place on the server 103.

In various embodiments, before or during the audio transmission by the client 101 (e.g., the audio stream containing the watermark embedded message) over the speaker, a notification can be produced to let the user know that the client 101 is attempting to communicate with the mobile device 102 and/or to instruct the user to turn on the mobile device 102, make sure that the mobile authentication application for receiving the transmission is running on the mobile device 102, and to bring the mobile device 102 in proximity of the client 101. For example, if the client 102 has a display, then a message containing any of this information can be displayed to the user. A message containing any of this information can also be conveyed by audio (e.g., a recording of a voice reciting the message can be played to the user). In other embodiments, particularly where the client is a relatively simple device instead of a desktop, a basic notification such as beep or a light (an LED) can be produced to let the user know that the client 101 is attempting to communicate with the mobile device 102 and the user should be aware of what steps to take based on previous instruction provided to the user.

To receive the audio transmission, the user launches the mobile authentication application on the mobile device 102 and brings the mobile device 102 within proximity of the client 101 (i.e., within proximity of the client's speaker), as necessary. In an embodiment, for additional security, the mobile authentication application may require the user to authenticate herself on the mobile device 102 using a local authentication method, such as by inputting a fingerprint, password, pattern, etc. before the mobile authentication application can be launched or before the mobile application is able to proceed with the authentication procedure.

In various embodiment, for added convenience, the system can be configured to limit the manual involvement by the user. For example, in an embodiment, the mobile authentication application runs in the background on the mobile device 102 constantly, listening to the inputs in the microphone at all times. Modern devices such as smartphones and smart watches currently have the functionality to always listen for incoming sounds (e.g., to pick up voice commands, etc.); which is a functionality that can be harnessed in this embodiment. In this case, the user merely needs to bring the mobile device 102 in sufficient proximity of the client 101 to receive the audio transmission. The mobile device then records the audio and automatically carries out the process of authentication the user, all without the user producing any inputs on the mobile device 102 itself.

In some embodiments, if the audio transmission is configured for a longer range, the mobile device 102 may be able to receive the audio transmission from the client 101 without the user having to handle the mobile device 102 at all. That is, the mobile device 102 may remain on the user (e.g., in the pocket, bag, etc.) and authentication can be completed automatically without the user having to take out and place the mobile device near the client 101 speaker.

Thus, after the audio signal is transmitted from the client 101, the mobile authentication application on the mobile device 102 accesses the microphone of the mobile device 102, records and captures the audio transmission (e.g., the watermarked audio signal), decodes the signal, and extracts the information in the message (e.g., the session token and server information). In various embodiments, the mobile device's native audio receiving functions can be used for receiving and recording the audio signal. The mobile authentication application then identifies the server 101 based on the received server information (e.g., it retrieves the server IP address from the received information) and sends a request to be authenticated to the server 103 over a network connection.

The request from the mobile authentication application to the server 103 contains a mobile device 102 ID, the user's login credentials, and the server token received from the client 101. The mobile authentication application obtains the user's login credentials from a memory location on the mobile device 102 where the credentials are stored. However, if the mobile authentication application cannot locate applicable user credentials on the mobile device 102, then the mobile authentication application can request the user to input the user's credentials manually and the credentials can be stored in memory on the mobile device 102, from where they can be automatically retrieved by the mobile authentication application next time the credentials are requested (e.g., on the next login). This way, the user does not have to enter the credentials manually again on following logins.

In various embodiments, the mobile device 102 ID can be used by the server 103 to verify that the mobile device 102 is registered or authorized on the system. For example, the server 103 can contain a list of all registered or authorized device IDs and check that the received mobile device 102 ID is in the list. If the received mobile device 102 ID is in the list, then the server 103 proceeds with the authentication process; if it is not, then authentication is declined. This allows the system and administrators to control what devices are permitted to authenticate users. For example, if a user's device falls into the wrong hand or is lost, the device's ID can be revoked on the server (e.g., removed from the list by administrators), which will disqualify any future attempts at authentication using the device. Device IDs can also serve as an auditing function to create a log or history of what devices are used by users for authenticating. Considering that a given user may have multiple devices that he or she uses at different times and places to authenticate, it may be useful to have a record of which device is used for each authentication attempt.

Since the request to be authenticated from the mobile device 102 contains sensitive information, such as the user's credentials, it should be sent in a secure manner or over a secure channel such as SSL. In various embodiments, the server token received at the mobile device 102 from the client 101 is in encrypted form. As described above, the server token is generated at the server, encrypted, and then conveyed to the client 101, and from the client to the mobile device 102, in encrypted form. Maintaining the session token in encrypted form on the client 101 and the mobile device 102 can prevent tampering with the token and its contents (e.g., the session ID) on the client 101 and on the mobile device 102. Consequently, the request from the mobile authentication application to the server 103 contains the mobile device 102 ID, the user's login credentials, and the encrypted server token. This request is sent from the mobile device 102 to the server 103 over a secure connection such as SSL.

The server 103 receives the mobile device's 102 request message over the secure channel and reads it. From the message, the server 103 obtains the user's login credentials and verifies them. The server also obtains the mobile device 102 ID from the request message and verifies that the mobile device 102 is an approved mobile device for purposes of authentication. To validate the received user credentials, the server 103 compares the received credentials (e.g., a user name and password) with credentials that the server 103 has stored for the user in the server's user ID/password database. To verify that mobile device 102 is authorized to make an authentication request, the server 103 checks that the mobile device 102 ID is included in a list of devices that are authorized to make authentication requests. The server 103 also decrypts the session token and verifies that the token is valid, e.g., that the timeframe provided in the token is not past its expiration, and the server 103 identifies the corresponding session that was created for the user based on the session ID in the token. If everything is verified successfully, then the server 103 authenticates the user, permits the login into the session, and notifies the client 101 accordingly. Otherwise, authentication is denied.

When checking the token, in the case that the server 103 determines that the token has expired, authentication is not permitted even though the login credentials may be accurate. Similarly, if device ID checking is enabled and the mobile device 102 ID provided is not included in the list of approved devices, the request will not be approved. Aside from the token expiration period, the server 103 can implement various other criteria for controlling the circumstances under which authentication is permitted. For example, authentication can be limited based on the geographic location of the client 101 and/or mobile device 103. In this case, authentication would not be permitted if the client 101 and/or mobile device 102 were inside a restricted area or outside of a permitted area. To enforce the restriction, the server could check the internet protocol (IP) address of the client 101 and/or mobile device 102 before permitting authentication and make sure that the IP address is in an allowed location. The server 103 could use other location methods such as Global Position Satellite (GPS) as well. Particularly in cases where the client is a device capable of relocating (e.g., a vehicle), limiting the locations where authentication is permitted can be useful. Depending on the application and as applicable, such client and/or mobile device location data can be conveyed as part of the server token, or the data can be conveyed separately in association with the token. GPS credentials can be used to prevent the authentication request either at the client or at the mobile device if the location of either falls outside the approved boundaries. Optionally, the mobile device 102 can communicate its GPS credentials as part of the request to the server 103, giving the server the ability to approve or deny authentication based on the mobile device's 102 location criteria.

In another embodiment, limitations can be imposed by the server 103 on when (e.g., what hours, days, etc.) a client will allow authentication. This may be used, for example, to only allow use of a client during business hours (e.g., to allow for maintenance, for security, etc.). The system can also impose limitations on network, network type, or network location, such that authentication is only permitted when the mobile device 102 and/or client 101 is on a permitted network, network type, or network location.

After the user is successfully authenticated, the user is allowed access to the session by the client 101. In the case of authentication on a web-based application, the server 103 sends the browser on the client 101 a response that authentication is successful, and the browser is redirected to the corresponding webpage for the user session. In the case of authentication on a native or client-based application, the server 103 communicates to the client 101 and the native application to log the user into the session.

The example of FIG. 1 illustrates a desktop computer client 101 that provides authenticated access to a web-based or native application, which is an evident application of the invention. However, in other embodiments a vast diversity of different devices can be implemented as clients. Essentially, any applicable computing device with a speaker can operate as a client in this system. The client can be a headless system (a computer system or device configured to operate without a monitor, keyboard, and mouse) such as a Mac mini, available from Apple, Inc. For example, the client could be a device containing a speaker and one button for requesting a session. The user would push the button and the device would issue a sound that is picked up by the user's mobile device. The mobile device would then authenticate the user with the server and the user would be permitted to access some function or application enabled through the device.

In other embodiments, the client can be incorporated into a mechanical device such as an automobile, for example, so that the user needs to be authenticated to operate the device or to have access to some aspect of the device or device function. In the automobile scenario, the user could similarly make an input requesting to authenticate herself on the vehicle and then use the user's mobile device to receive an audio transmission from a speaker on the vehicle. The mobile device would then authenticate the user directly with the server, which would communicate back to the car to enable certain functionality of the vehicle once the user is successfully authenticated.

Another implementation of the invention is in applications for visually impaired individuals. Because the system allows performing user authentication with minimal user involvement, at most requiring the user to bring the mobile device in proximity of the client's speaker and make limited inputs on the mobile device, the system can be used to give users who are visually impaired and would not normally be capable of accessing a particular client due to an inability to see the screen, keyboard, etc., a way to log into the system. For example, in a system designed for the visually impaired, the client could implement screen reader software in conjunction with the system for user authentication provided herein. Screen readers are software applications that convey what people with normal eyesight see on a display to their users via text-to-speech, in order to better enable visually impaired users to use the devices. This would provide a visually impaired person with a secure and convenient way to access a client designed for use by the visually impaired.

Figure 2:
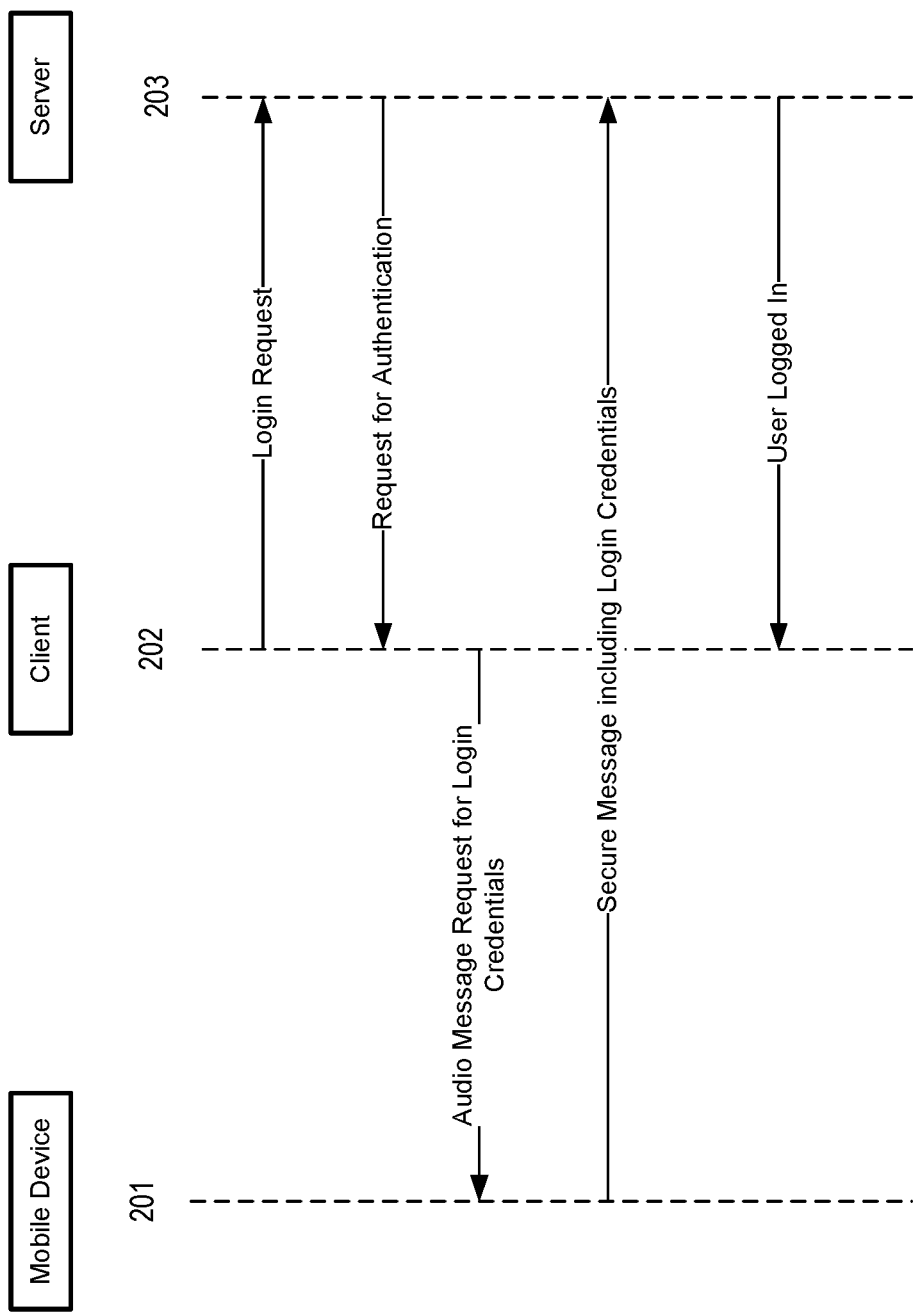
FIG. 2 illustrates an example of a process for user authentication on a client using a mobile device over the audio channel, in accordance with various embodiments.

FIG. 2 illustrates an example of a process for user authentication on a client using a mobile device over the audio channel, in accordance with various embodiments. The process begins by a login request being sent from a client 202 to the server 203. The login request can be generated and sent by the client 202 when a user requests a session on the client 202, such as to log into an application or to use a functionality of the client 202. In response, the server 203 creates a session corresponding to the login request and sends a request for authentication to the client 202 over a network connection, the request containing a token that includes the session ID and an expiration time. The token can be encrypted by the server 203 to prevent tampering. In various embodiments, the request for authentication also contains information identifying the server, such as the server address, which does not need to be encrypted. The request for authentication containing the encrypted token and the server information is conveyed to the client 202 over a secure channel such as SSL.

The client 202 receives the request for authentication from the server 203 and broadcasts an audio message requesting login credentials to the mobile device 201, the request containing the encrypted token received from the server 203 as well as the information identifying the server.

The audio message can be produced using an audio watermarking algorithm, as described previously. The mobile device 201 receives the audio message and decodes it (e.g., using the audio watermark algorithm) to reveal the contents of the request which will include the encrypted token and the server address information. The mobile device 201 then retrieves the user credentials, such as the user ID and password, which are stored on the mobile device 201, and sends a secure message requesting to be authenticated (e.g., a request to authenticate the user for the session), over a secure channel such as secure sockets layer (SSL), to the server 203 over the network, the message including the user's login credentials, the mobile device ID, and the encrypted token provided by the client 202 over the audio transmission.

The server 203 receives the message from the mobile device 201 over the secure channel. The server then decrypts the token, verifies the user credentials (e.g., by checking the user ID and password against credentials that the server has stored for the user), checks that the expiration time in the token has not expired, verifies that the mobile device is authorized to submit an authentication request based on the mobile device ID, and checks if any other conditions have been violated (e.g., geographical positioning, etc., as discussed above). If all verification is successful, the user is authenticated and the server 203 approves the user login at the client 202.

Figure 3:
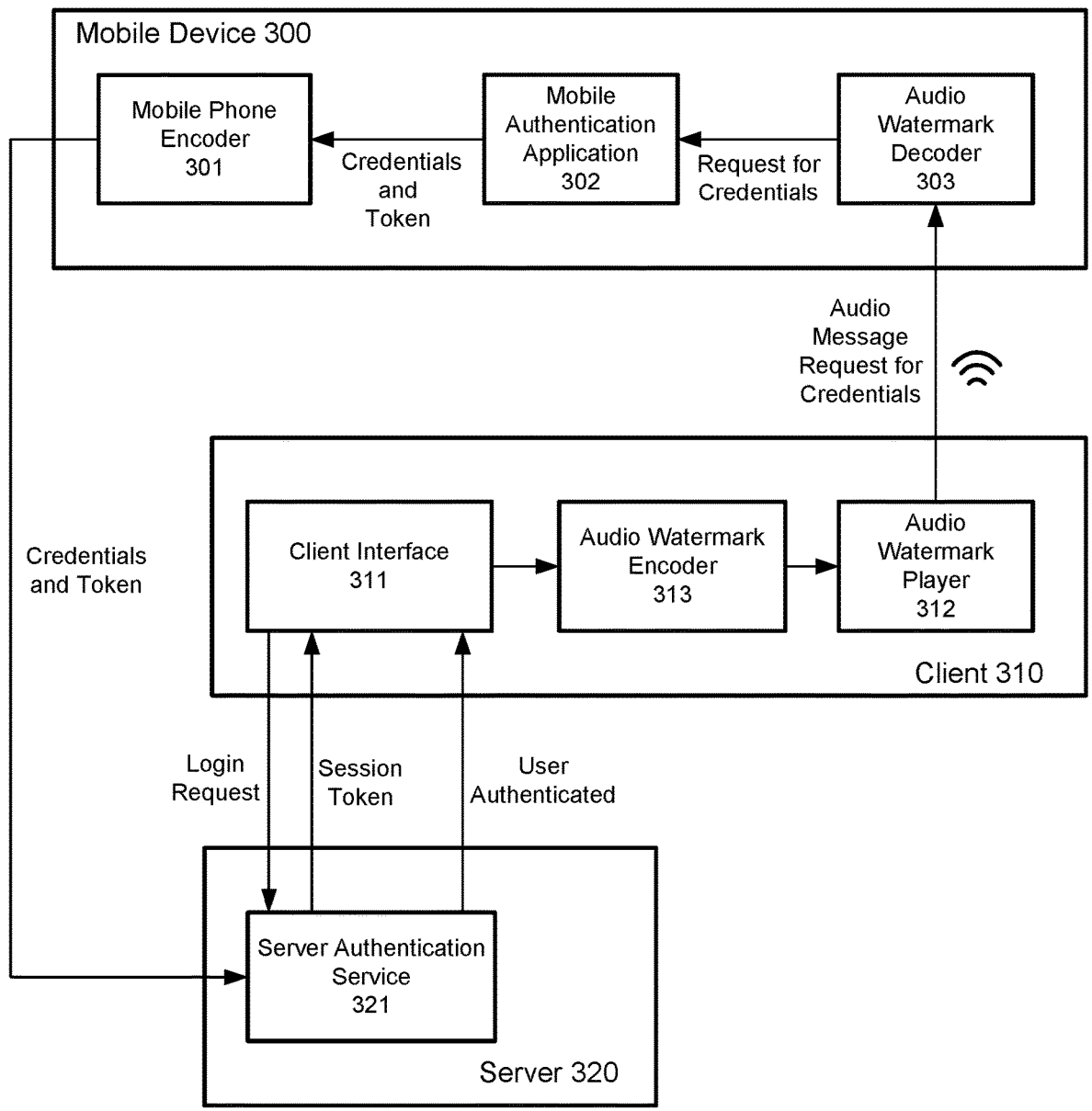
FIG. 3 illustrates an example architecture of a system for user authentication on a client using a mobile device over the audio channel, in accordance with various embodiments.

FIG. 3 illustrates an example architecture of a system for user authentication on a client using a mobile device over the audio channel, in accordance with various embodiments. As illustrated in the example of FIG. 3, the client 310 contains a client interface module 311. When a user login on the client 310 is requested, the client interface module 311 sends a login request to a server authentication service module 321 on the server 320. The server authentication service 321 generates and encrypts a session token in response to the login request, the session token including a session ID and an expiration time, and conveys the encrypted session token back to the client interface 311 along with the server's information such as an IP or fully qualified domain name (FQDN) address.

The client interface 311 generates a message requesting the mobile device 300 to provide its login credentials to the server 320, the message including the encrypted session token for identifying the session and server information (IP address or FQDN) for identifying and locating the server 320. The client interface 311 conveys the message to an audio watermark encoder 313 on the client 310 to encode the message in a watermark of an audio transmission. The audio watermark encoder 313 encodes the message and passes the encoded audio transmission data to an audio watermark player 312, which plays the audio transmission containing the audio message request for user credentials via a speaker of the client 310 to be received by a microphone on the mobile device 300.

The audio transmission is received at a microphone of the mobile device 300, recorded, and conveyed to an audio watermark decoder 303, which decodes the transmission to extract the request for user credentials including the encrypted session token and server information. The request for user credentials is passed to a mobile authentication application 302 on the mobile device 300, which retrieves the user credentials from storage on the mobile device 300 and produces a message to request the server 320 to authenticate the user including the user credentials and the encrypted token (the server information received from the client 310 is used to locate and identify the server 320). If device ID checking is used in the system, the mobile authentication application 302 also retrieves the mobile device 300 ID from the mobile device 300 and includes it in the produced message. In various embodiments, the mobile authentication application 302 can also include other information in the message as discussed above, such as GPS coordinates.

The mobile authentication application 302 passes the message including the user credentials, mobile device 300 ID, the encrypted token, and other optional information such as GPS coordinates to a mobile phone encoder 301, which encodes the message and sends it to the server 320. The message is received by the server authentication service 321 on the server 320, parsed, and the token is decrypted to reveal the session ID and expiration time previously assigned. The server authentication service 321 verifies the user credentials, checks that the mobile device 300 is authorized based on the mobile device 300 ID, confirms the validity of the token contents, and checks any other information such as the GPS coordinates for compliance. If all verification is successful, the user is authenticated and the server authentication service 321 conveys a message to the client interface 311 indicating that the user is authenticated for the session.

Figure 4:
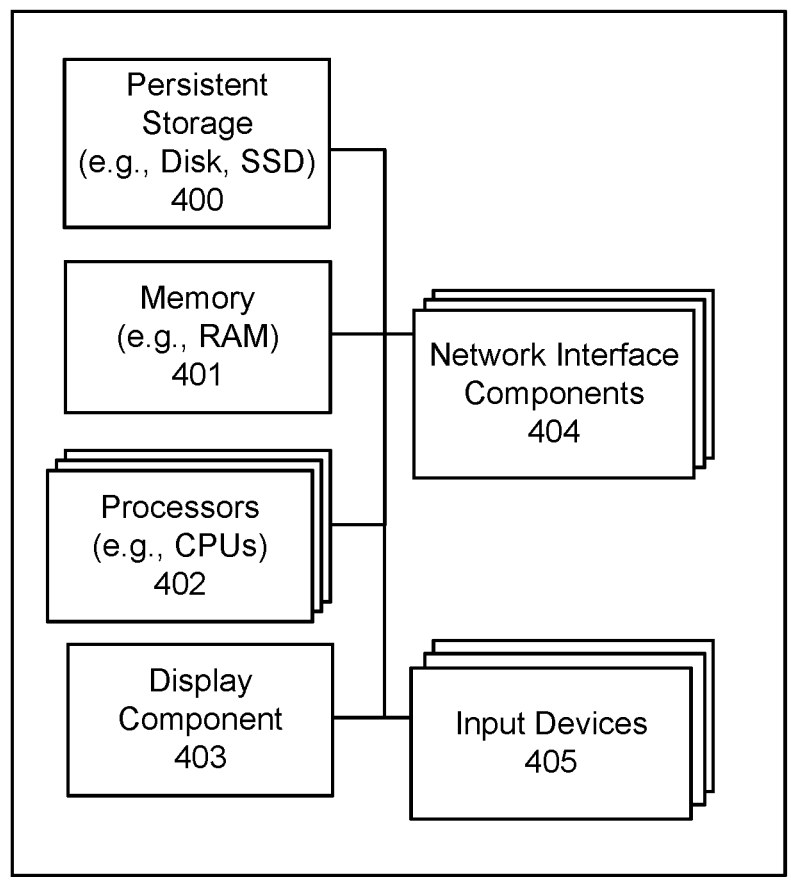
FIG. 4 illustrates an example of some general components of a computing device, in accordance with various embodiments.

FIG. 4 illustrates an example of some general components of a computing device, in accordance with various embodiments. In this particular example, the device includes one or more processors (e.g., central processing units (CPUs) 402 for executing instructions that can be stored in a storage medium component. The storage medium can include many types of memory, persistent data storage, or non-transitory computer-readable storage media. For example, the storage medium may take the form of random access memory (RAM) 401 storing program instructions for execution by the processor(s) 402, a persistent storage (e.g., disk or SSD) 400, a removable memory for sharing information with other devices and/or the like. The computing device typically can further comprise a display component 403, such as a monitor, a touch screen, liquid crystal display (LCD), or the like. In various embodiments, the computing device will include at least one input device 405 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 404 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for authenticating a user on a client device using a mobile device, comprising:
    receiving, at an authentication server, a login request from the client device;
    on the authentication server, generating a token identifying a corresponding session on the client device;
    using an audio watermark algorithm, embedding the token identifying the session as an audio watermark into an audio message and broadcasting the audio message on a speaker of the client device;
    by the mobile device, receiving the audio message from the client device over an audio channel using a microphone;
    decoding the audio message to extract the token identifying the session as the audio watermark in the audio message;
    in response to the received audio message containing the token,
    retrieving user login credentials from storage on the mobile device for authenticating the user in the session;
    conveying an authentication request including the user login credentials and the token identifying the session obtained from the audio message to the authentication server;
    at the authentication server,
    receiving from the mobile device the authentication request;
    verifying that the user login credentials are accurate; and
    in response to verifying that the user login credentials are accurate, authenticating the user for the session on the client device.

2. The method of claim 1, wherein the encoded token is repeated multiple times throughout the duration of the audio message.

3. The method of claim 1, further comprising:
    conveying the token from the server to the client device; and
    on the client device, embedding the token into the audio message using the audio watermark algorithm.

4. The method of claim 1, further comprising generating an output by the client device indicating to a user of the client device to bring the mobile device in proximity of the client device.

5. The method of claim 1, wherein the client device is a headless system.

6. The method of claim 1, wherein the client implements screen reader software for assisting visually impaired individuals.

7. The method of claim 1, wherein the generated token includes an expiration time, wherein the authentication server verifies that the authentication request is received from the mobile device within the expiration time.

8. The method of claim 1, wherein the authentication request to the authentication server further includes a mobile device ID corresponding to the mobile device, wherein the authentication server verifies that the mobile device is authorized based on the mobile device ID.

9. A computing device for authenticating a user on a client device using a mobile device, comprising:
at least one processor; and
memory including instructions that, when executed by the at least one processor, cause the computing device to perform the steps of:
receiving, at an authentication server, a login request from the client device;
on the authentication server, generating a token identifying a corresponding session on the client device;
using an audio watermark algorithm, embedding the token identifying the session as an audio watermark into an audio message and broadcasting the audio message on a speaker of the client device;
by the mobile device,
receiving the audio message from the client device over an audio channel using a microphone;
decoding the audio message to extract the token identifying the session as the audio watermark in the audio message;
in response to the received audio message containing the token,
retrieving user login credentials from storage on the mobile device for authenticating the user in the session;
conveying an authentication request including the user login credentials and the token identifying the session obtained from the audio message to the authentication server;
at the authentication server,
receiving from the mobile device the authentication request;
verifying that the user login credentials are accurate; and
in response to verifying that the user login credentials are accurate, authenticating the user for the session on the client device.

10. The computing device of claim 9, wherein, wherein the encoded token is repeated multiple times throughout the duration of the audio message.

11. The computing device of claim 9, further comprising instructions that when executed by the one or more processors cause the one or more processors to execute the operations of:
conveying the token from the server to the client device; and
on the client device, embedding the token into the audio message using the audio watermark algorithm.

12. The computing device of claim 9, wherein the memory further includes instructions that when executed by the at least one processor, cause the computing device to perform the steps of:
generating an output by the client device indicating to a user of the client device to bring the mobile device in proximity of the client device.

13. The computing device of claim 9, wherein the client device is a headless system.

14. The computing device of claim 9, wherein the generated token includes an expiration time, wherein the authentication server verifies that the authentication request is received from the mobile device within the expiration time.

15. A non-transitory computer readable storage medium comprising one or more sequences of instructions, the instructions when executed by one or more processors causing the one or more processors to execute the operations of:
receiving, at an authentication server, a login request from the client device;
on the authentication server, generating a token identifying a corresponding session;
using an audio watermark algorithm, embedding the token identifying the session as an audio watermark into an audio message and broadcasting the audio message on a speaker of the client device;
by the mobile device,
receiving the audio message from the client device over an audio channel using a microphone;
decoding the audio message to extract the token identifying the session as the audio watermark in the audio message;
in response to the received audio message containing the token,
retrieving user login credentials from storage on the mobile device for authenticating the user in the session;
conveying an authentication request including the user login credentials and the token identifying the session obtained from the audio message to the authentication server;
at the authentication server,
receiving from the mobile device the authentication request;
verifying that the user login credentials are accurate; and
in response to verifying that the user login credentials are accurate, authenticating the user for the session on the client device.

16. The non-transitory computer readable storage medium of claim 15, wherein the encoded token is repeated multiple times throughout the duration of the audio message.

17. The non-transitory computer readable storage medium of claim 15, further comprising instructions that when executed by the one or more processors cause the one or more processors to execute the operations of:
conveying the token from the server to the client device; and
on the client device, embedding the token into the audio message using the audio watermark algorithm.

* * * * *